(12) United States Patent
Metrick (10) Patent No.: US 12,171,174 B1
(45) Date of Patent: Dec. 24, 2024

(54) PLANTER ASSEMBLY

(71) Applicant: Lawrence Metrick, Lake Bluff, IL (US)

(72) Inventor: Lawrence Metrick, Lake Bluff, IL (US)

(*) Notice: Subject to any disclaimer, the term of this patent is extended or adjusted under 35 U.S.C. 154(b) by 15 days.

(21) Appl. No.: 18/209,933

(22) Filed: Jun. 14, 2023

(51) Int. Cl.
*A01G 9/02* (2018.01)
*A01G 9/00* (2018.01)

(52) U.S. Cl.
CPC .......... *A01G 9/02* (2013.01); *A01G 2009/003* (2013.01)

(58) Field of Classification Search
CPC .......... A01G 9/02; A01G 9/028; A01G 9/029; A01G 9/0293; A01G 9/0295; A01G 2009/003
See application file for complete search history.

(56) References Cited

U.S. PATENT DOCUMENTS

| | | | |
|---|---|---|---|
| 495,808 A * | 4/1893 | Holt et al. | A01G 9/02 47/75 |
| 2,486,932 A * | 11/1949 | Elliott | A47G 7/041 47/41.13 |
| 5,471,788 A | 12/1995 | Willes | |
| 6,516,563 B1 * | 2/2003 | Matthews | A01G 9/02 47/79 |
| 7,805,886 B2 | 10/2010 | Brandstatter | |
| D769,148 S | 10/2016 | Siegel | |
| 10,709,072 B2 | 7/2020 | Ryan | |
| 11,638,492 B2 * | 5/2023 | Peterson | A47G 7/041 47/39 |
| 2007/0084107 A1 | 4/2007 | Ganti | |
| 2014/0325905 A1 | 11/2014 | Novotny | |
| 2017/0295728 A1 * | 10/2017 | Ryan | A01G 9/02 |
| 2021/0282333 A1 | 9/2021 | Cooper | |
| 2021/0352850 A1 | 11/2021 | Tang | |

FOREIGN PATENT DOCUMENTS

WO WO2013034274 3/2013

* cited by examiner

*Primary Examiner* — Ebony E Evans (57) ABSTRACT

A planter assembly for removably positioning a plant in soil includes an outer container with a base wall and a perimeter wall. The perimeter wall is coupled to and extends upwardly from the base wall. The outer container defines an interior space therein, and a top edge of the perimeter wall defines an opening to the interior space. An inner container is positionable in the interior space of the outer container and comprises a bottom wall and a peripheral wall. The peripheral wall is coupled to and extends upwardly from the bottom wall. The inner container defines a cavity therein, and an upper edge of the peripheral wall defines an aperture to the cavity. The cavity has a size such that the inner container is configured for holding the plant and a soil substrate in the cavity.

10 Claims, 11 Drawing Sheets

PLANTER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to planters and more particularly pertains to a new planter for removably positioning a plant in soil.

(2) Description of Related Art Including Information Disclosed Under 37 CFR 1.97 and 1.98

The prior art relates to planters which are usable to removably position a plant in soil. But the prior art fails to disclose a planter with an inner container that is removably insertable into an outer container such that the inner container is rotatable with respect to the outer container. Such an apparatus would be advantageous over the prior art because a plant would be rotatable for aesthetic or practical purposes (such as exposing a desired portion of the plant to sun) with respect to the soil.

BRIEF SUMMARY OF THE INVENTION

An embodiment of the disclosure meets the needs presented above by generally comprising an outer container with a base wall and a perimeter wall. The perimeter wall is coupled to and extends upwardly from the base wall. The outer container defines an interior space therein, and a top edge of the perimeter wall defines an opening to the interior space. An inner container is positionable in the interior space of the outer container and comprises a bottom wall and a peripheral wall. The peripheral wall is coupled to and extends upwardly from the bottom wall. The inner container defines a cavity therein, and an upper edge of the peripheral wall defines an aperture to the cavity. The cavity has a size such that the inner container is configured for holding a plant and a soil substrate in the cavity.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
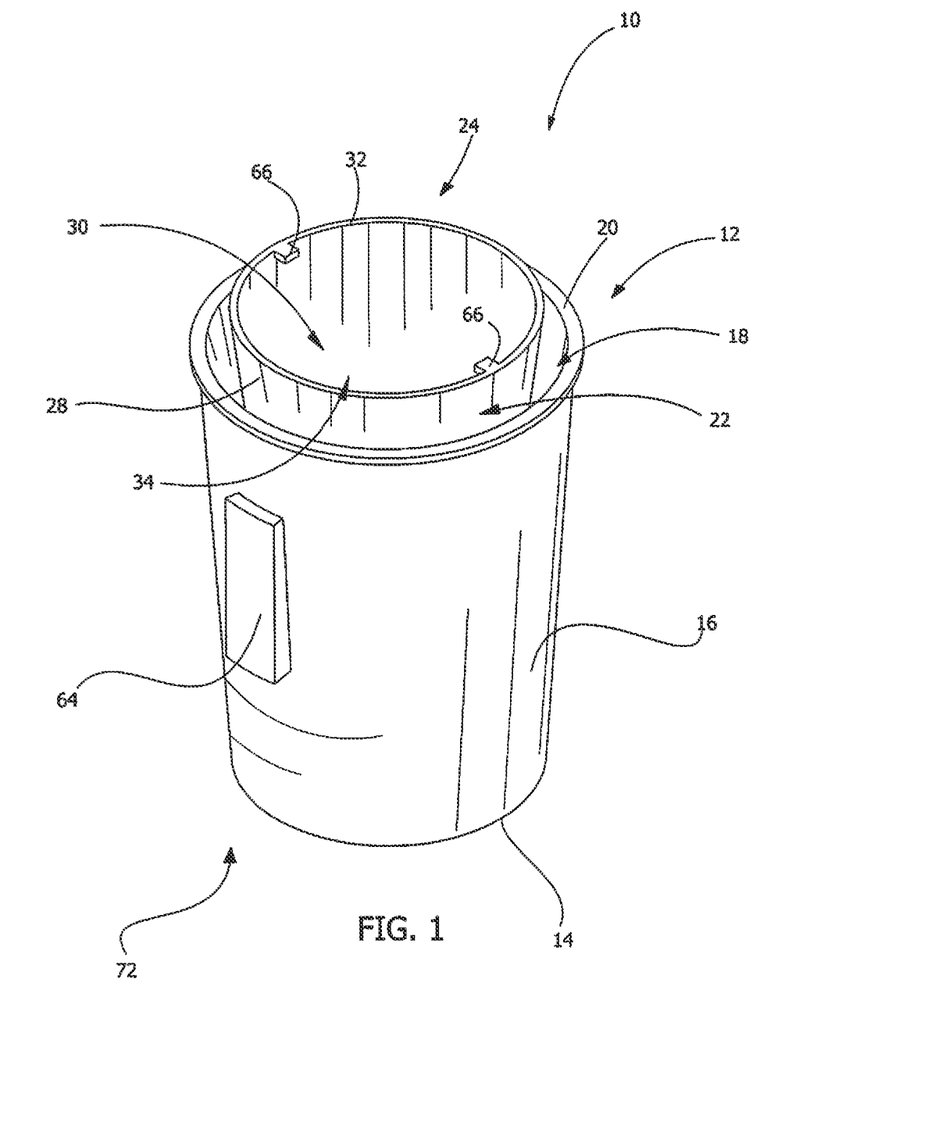
FIG. 1 is a top perspective view of a planter assembly according to an embodiment of the disclosure in a raised rotational configuration.
Figure 2:
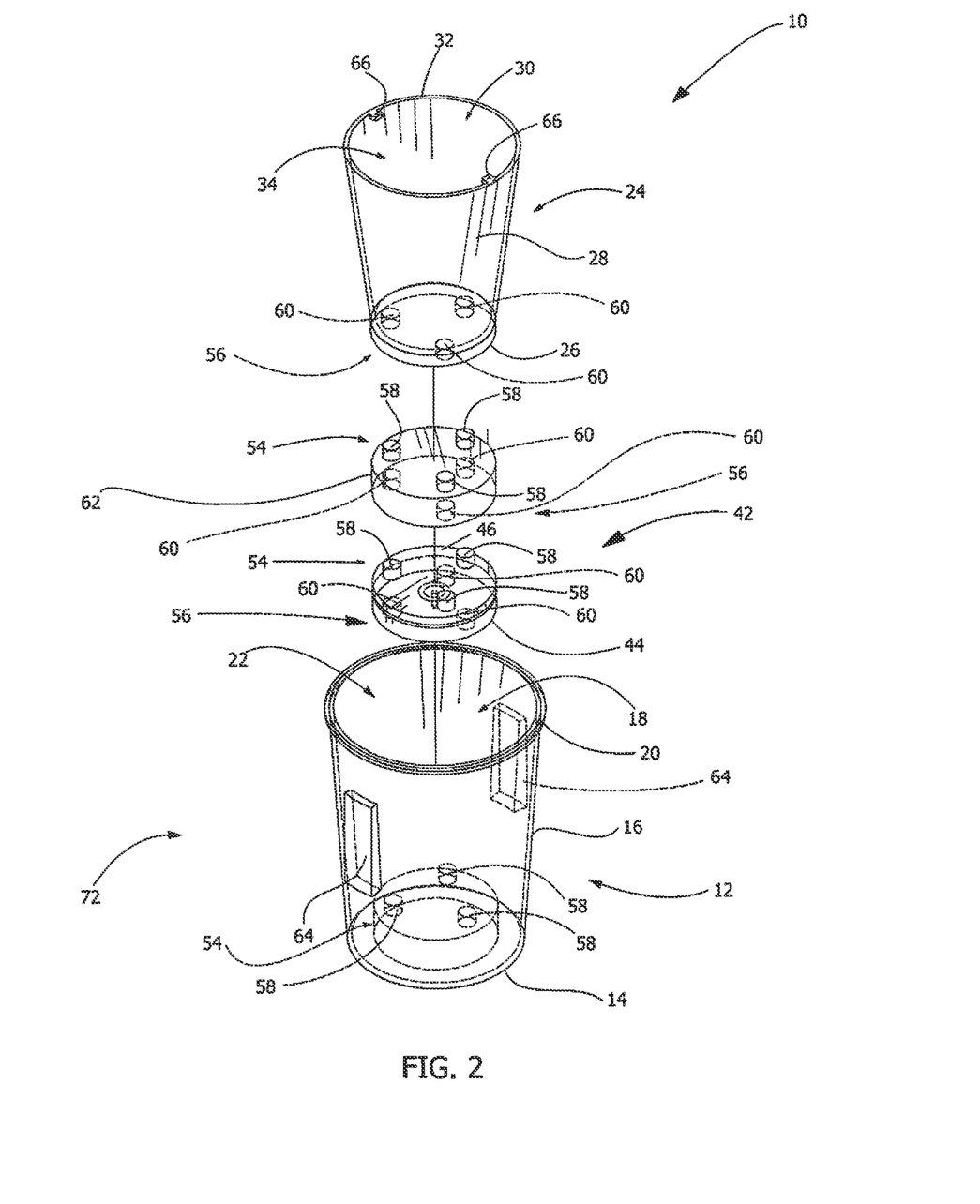
FIG. 2 is an exploded perspective view of an embodiment of the disclosure in the raised rotational configuration.
Figure 3:
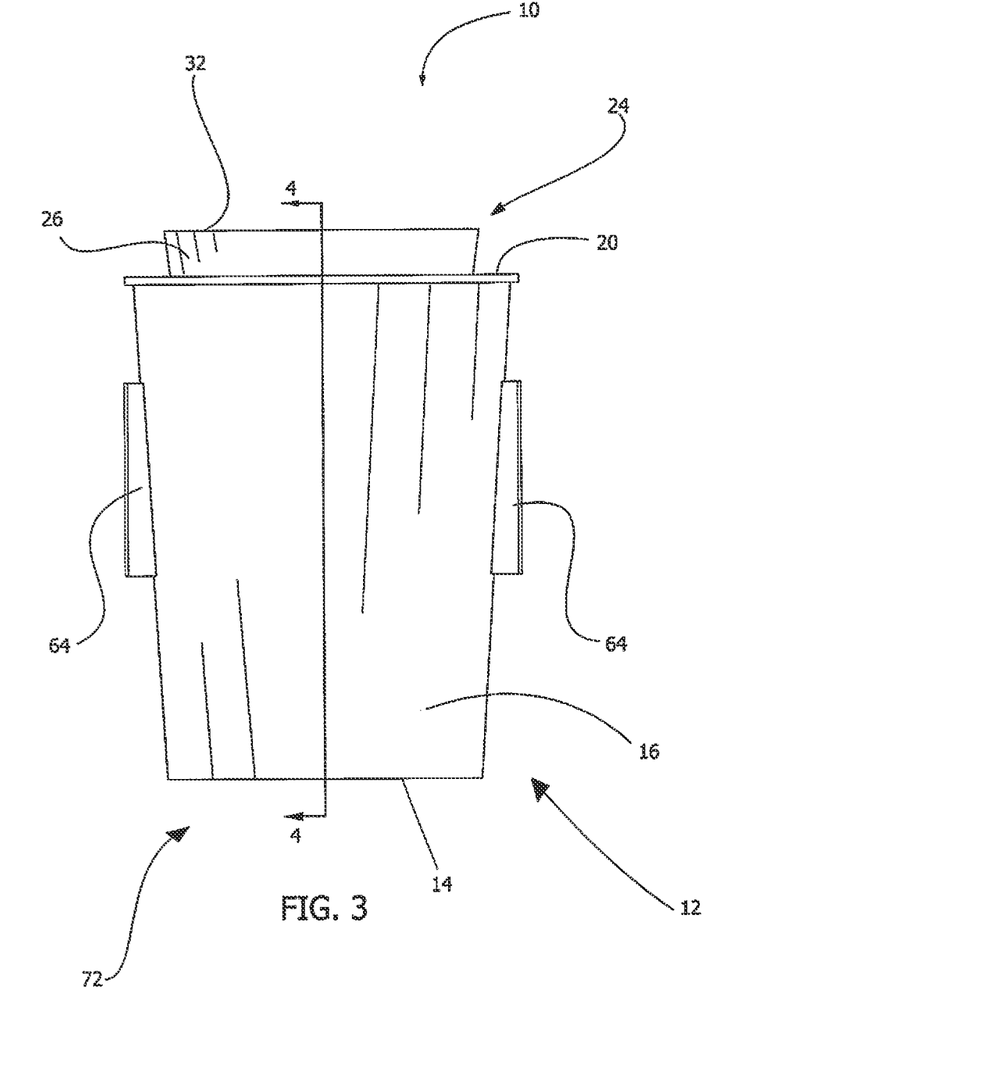
FIG. 3 is a front view of an embodiment of the disclosure in the raised rotational configuration.
Figure 4:
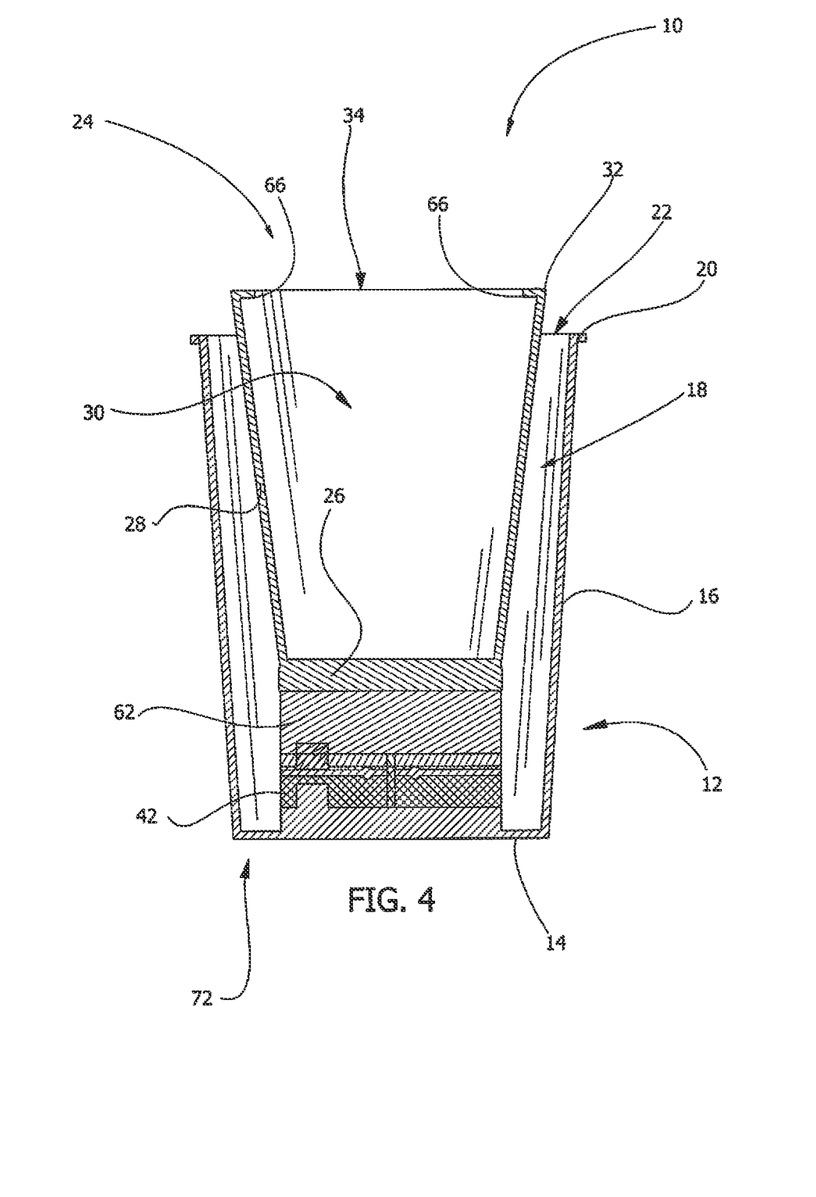
FIG. 4 is a cross-section view of an embodiment of the disclosure taken from Arrows 4-4 in FIG. 3.
Figure 5:
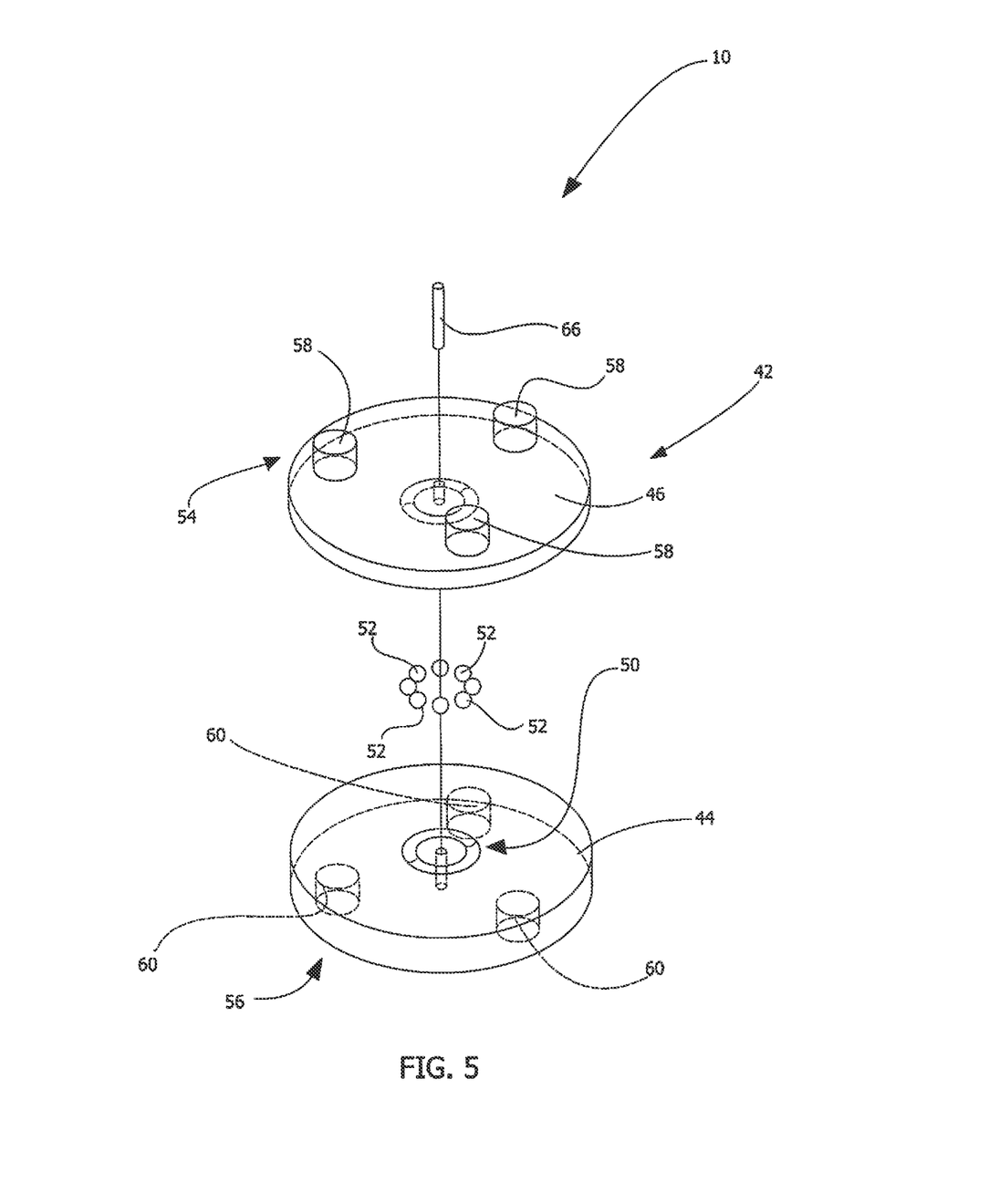
FIG. 5 is an exploded detail view of a turntable of an embodiment of the disclosure.
Figure 6:
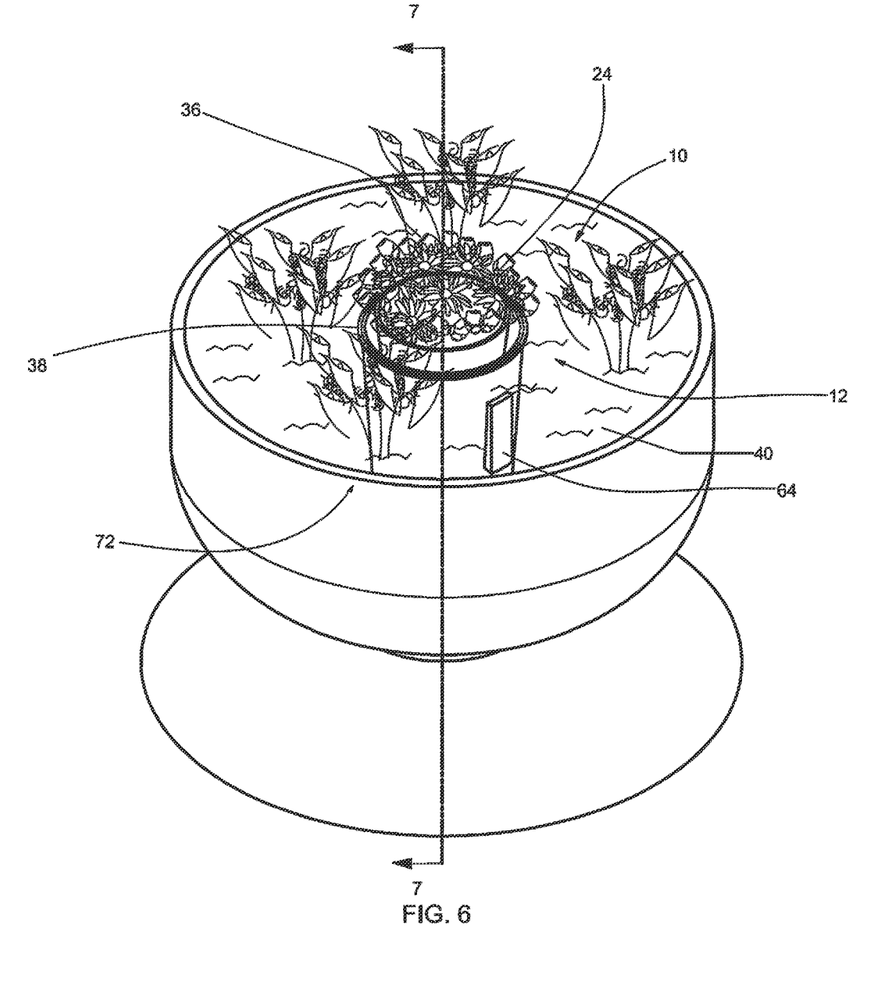
FIG. 6 is a perspective in-use view of an embodiment of the disclosure.
Figure 7:
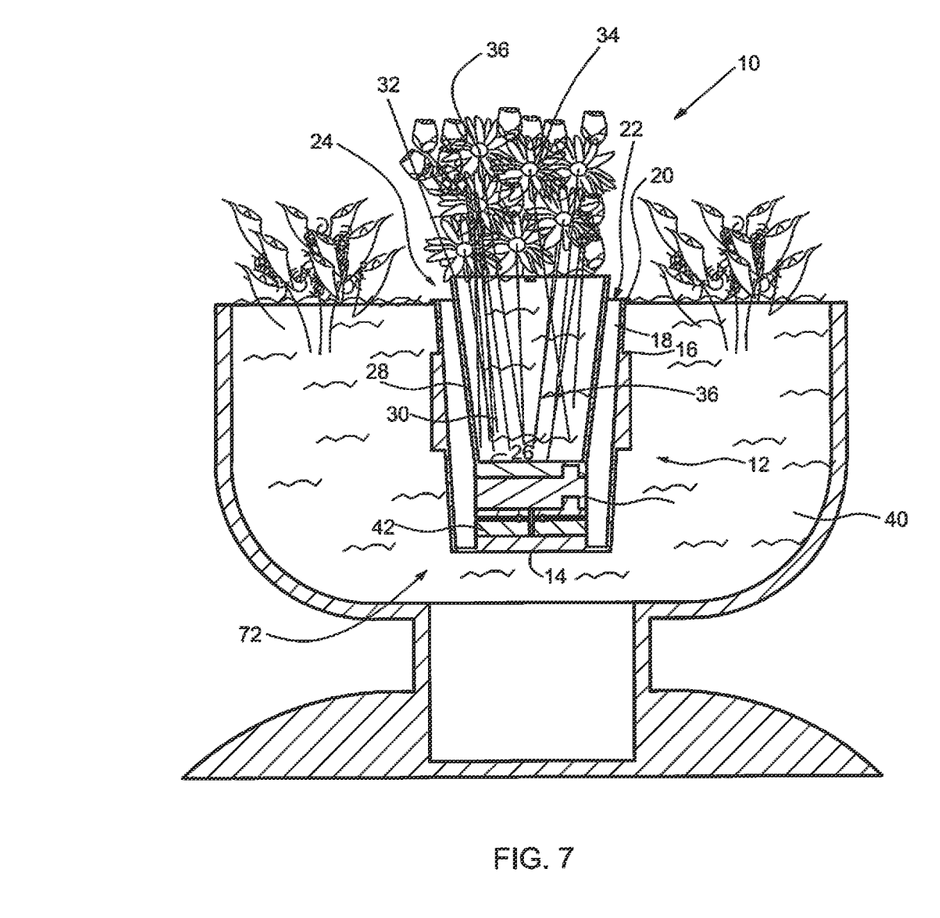
FIG. 7 is a cross-section view of an embodiment of the disclosure taken from Arrows 7-7 in FIG. 6.
Figure 8:
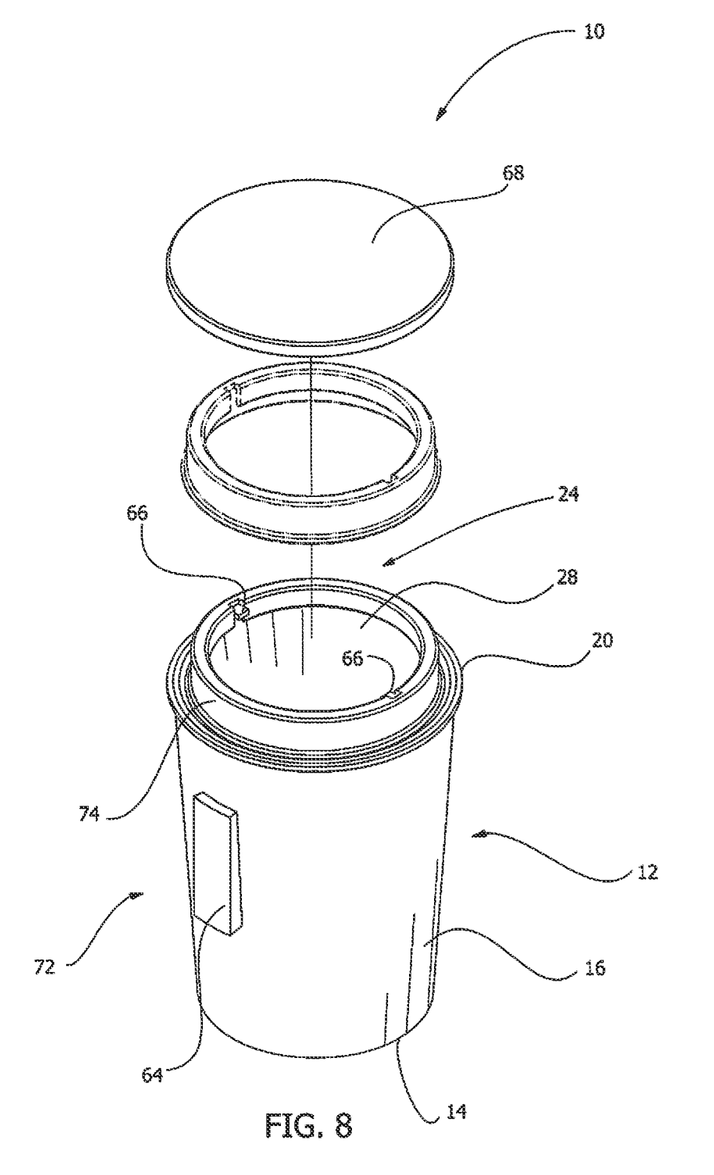
FIG. 8 is an exploded perspective view of an embodiment of the disclosure.
Figure 9:
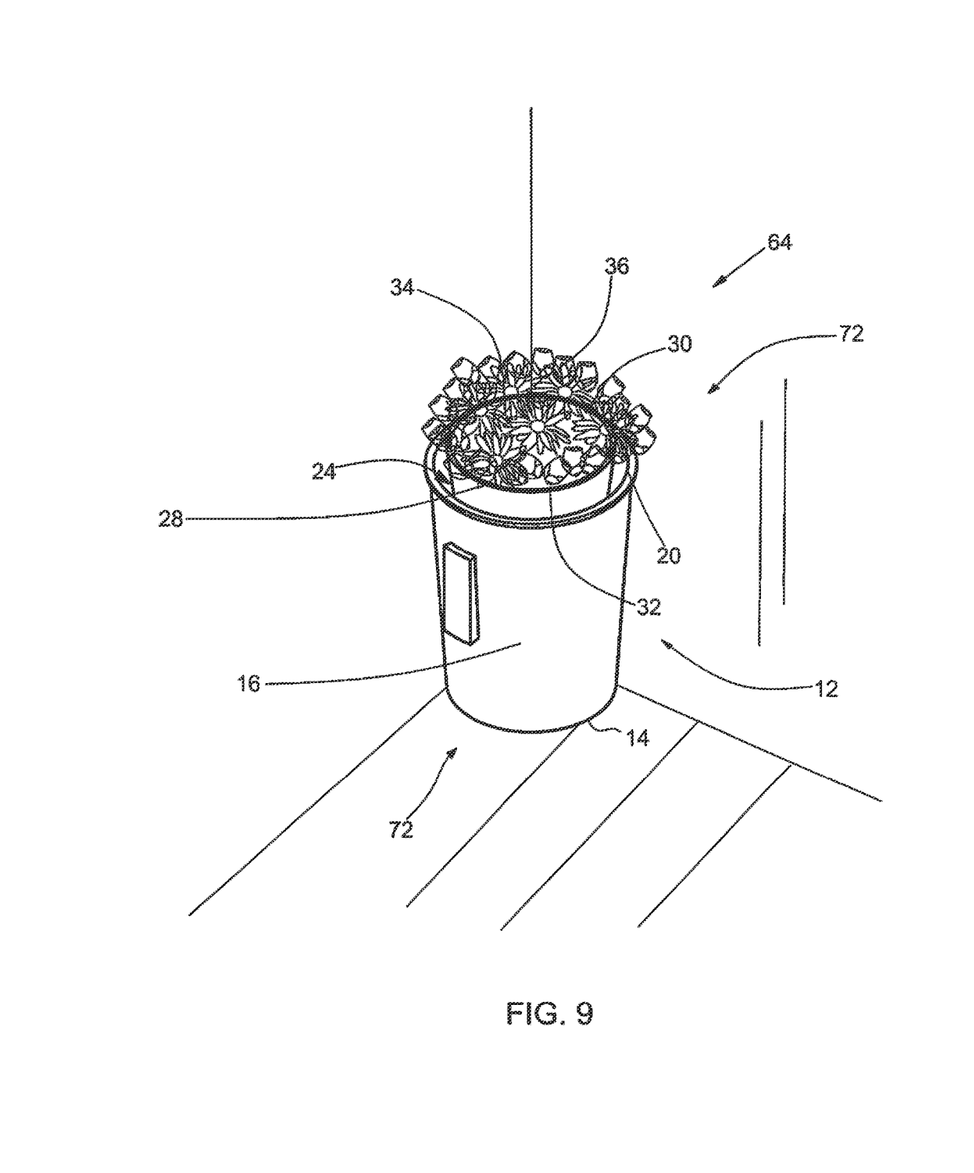
FIG. 9 is a perspective in-use view of an embodiment of the disclosure.
Figure 10:
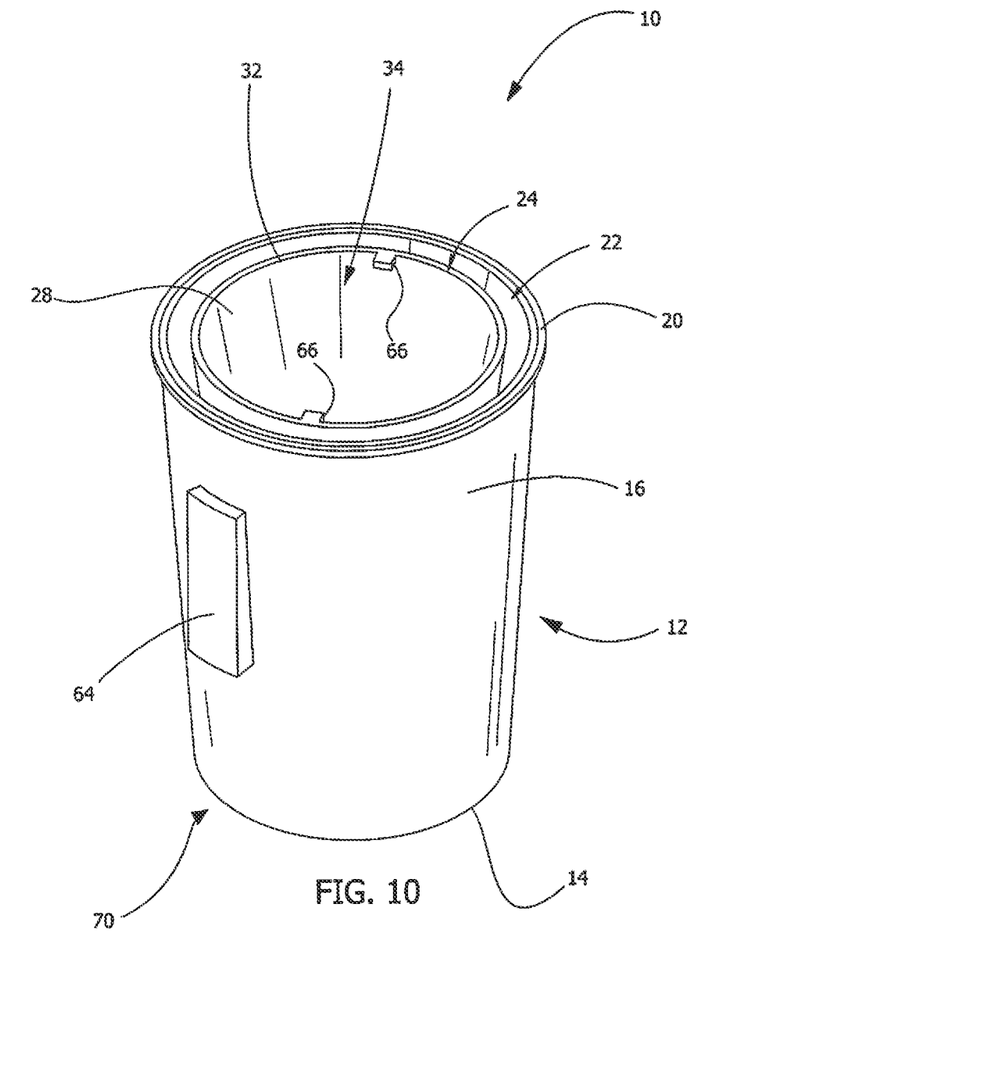
FIG. 10 is a perspective view of an embodiment of the disclosure in a rotational configuration.
Figure 11:
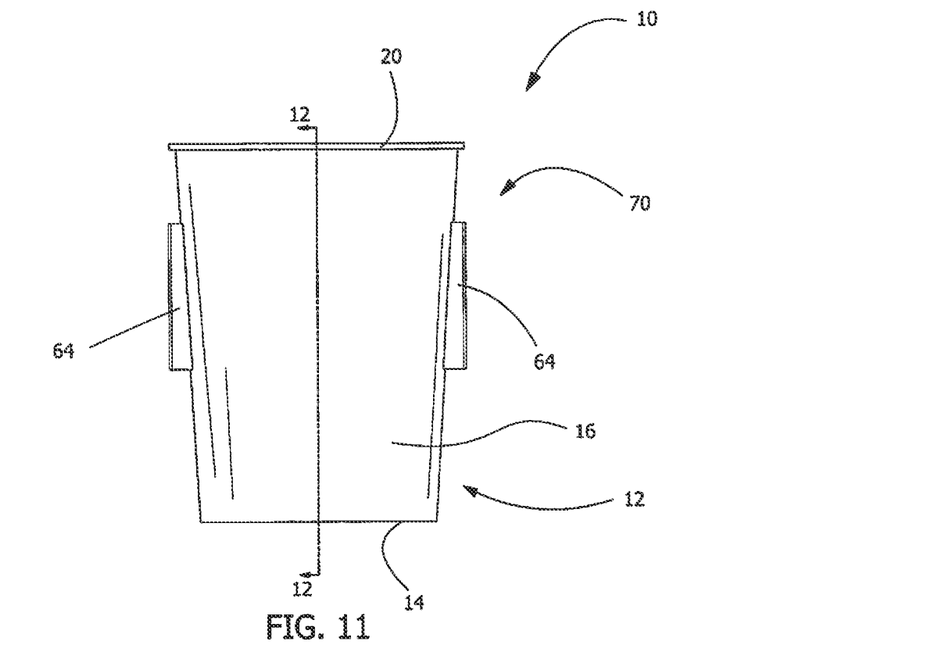
FIG. 11 is a front view of an embodiment of the disclosure in the rotational configuration.
Figure 12:
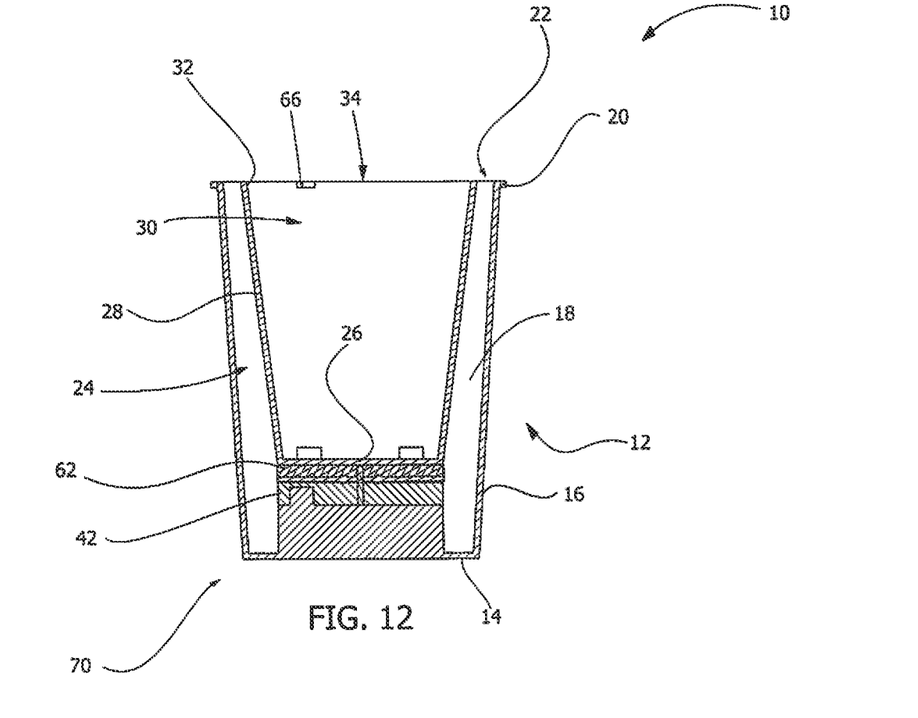
FIG. 12 is a cross-section view of an embodiment of the disclosure taken from Arrows 12-12 in FIG. 11.

With reference now to the drawings, and in particular to FIGS. 1 through 6 thereof, a new planter embodying the principles and concepts of an embodiment of the disclosure and generally designated by the reference numeral 10 will be described.

As best illustrated in FIGS. 1 through 6, the planter assembly 10 generally comprises an outer container 12 with a base wall 14 and a perimeter wall 16. The perimeter wall 16 is coupled to and extends upwardly from the base wall 14. The outer container 12 defines an interior space 18 therein, and a top edge 20 of the perimeter wall 16 defines an opening 22 to the interior space 18. An inner container 24 is positionable in the interior space 18 of the outer container 12 and comprises a bottom wall 26 and a peripheral wall 28. The peripheral wall 28 is coupled to and extends upwardly from the bottom wall 26. The inner container 24 defines a cavity 30 therein, and an upper edge 32 of the peripheral wall 28 defines an aperture 34 to the cavity 30. The cavity 30 has a size such that the inner container 24 is configured for holding a plant 36 and a soil substrate 38 in the cavity 30.

A turntable 42 is positionable between the base wall 14 of the outer container 12 and the bottom wall 26 of the inner container 24 such that the inner container 24 is rotatable with respect to the outer container 12. The turntable 42 comprises a bottom member 44, a top member 46, an axle pin 48, and a plurality of ball bearings 52. The top member 46 is positioned over the bottom member 44. The top member 46 and the bottom member 44 define an annular groove 50 therebetween, in which the plurality of ball bearings 52 is positioned. The axle pin 48 extends through the bottom member 44 and the top member 46 and rotatably couples the top member 46 to the bottom member 44. A platform 62 is insertable between the base wall 14 of the outer container 12 and the bottom wall 26 of the inner container 24 to increase a spacing between the outer container 12 and the inner container 24.

A plurality of first mating members 54 and a plurality of second mating members 56 are provided. Each first mating member 54 of the plurality of first mating members 54 is coupled to an associated one of each of the outer container 12, the turntable 42, and the platform 62. Each second mating member 56 of the plurality of second mating members 56 is coupled to an associated one of each of the turntable 42, the platform 62, and the inner container 24. Each first mating member 54 of the plurality of first mating members 54 is interchangeably coupled to each second mating member 56 of the plurality of second mating members 56. Each first mating member 54 of the plurality of first mating members 54 comprises a plurality of projections 58, and each second mating member 56 of the plurality of second mating members 56 comprises a plurality of receivers 60, wherein the plurality of receivers 60 is shaped and arranged to releasably receive the plurality of projections 58.

A pair of protrusions 64 is coupled to and extends outwardly from the outer container 12. The pair of protrusions 64 is configured to engage an external soil 40 when the outer container 12 is buried in the external soil 40 to prevent rotation of the outer container 12 with respect to the external soil 40. A pair of grip members 66 is coupled to the upper edge 32 of the peripheral wall 28 of the inner container 24. Each grip member 66 of the pair of grip members 66 extends inwardly from the inner container 24 with respect to the inner container 24. A lid 68 is couplable to the upper edge 32 of the peripheral wall 28 of the inner container 24 to cover the aperture 34 to the cavity 30.

The planter assembly 10 is positionable in a plurality of stacked configurations, including a rotatable configuration 70 and a raised rotatable configuration 72. The rotatable configuration 70 is defined by a stack of the outer container 12, the inner container 24, and the turntable 42. The turntable 42 is positioned between the outer container 12 and the inner container 24 in the rotatable configuration 70, and the upper edge 32 of the peripheral wall 28 of the inner container 24 is aligned with the top edge 20 of the perimeter wall 16 of the outer container 12 in the rotatable configuration 70.

The raised rotatable configuration 72 is defined by a stack of the outer container 12, the inner container 24, the turntable 42, and the platform 62. Each of the turntable 42 and the platform 62 is positioned between the outer container 12 and the inner container 24 in the raised rotatable configuration 72. The upper edge 32 of the peripheral wall 28 of the inner container 24 is spaced above the top edge 20 of the perimeter wall 16 of the outer container 12 in the raised rotatable configuration 72. A skirt 74 is couplable to the upper edge 32 of the peripheral wall 28 of the inner container 24 cover a portion of the inner container 24 which extends upwardly past the top edge 20 of the perimeter wall 16 of the outer container 12 when the planter assembly 10 is positioned in the raised rotatable configuration 72.

In use, the outer container 12 is buried in the external soil 40, and the plant 36 and the soil substrate 38 are positioned in the inner container 24. The inner container 24 is positioned in the outer container 12 so that the plant 36 may be positioned similar to if it had been planted in the external soil 40. The turntable 42 may be positioned between the inner container 24 and the outer container 12 to allow the inner container 24 to rotate within the outer container 12 and align the upper edge 32 of the peripheral wall 28 of the inner container 24 with the top edge 20 of the perimeter wall 16 of the outer container 12. The turntable 42 and the platform 62 may be positioned between the inner container 24 and the outer container 12 to allow the inner container 24 to rotate within the outer container 12 and space the upper edge 32 of the peripheral wall 28 of the inner container 24 above the top edge 20 of the perimeter wall 16 of the outer container 12.

The skirt 74 may be coupled to the upper edge 32 of the peripheral wall 28 of the inner container 24 when the planter assembly 10 is positioned in the raised rotatable configuration 72 to cover the portion of the inner container 24 which extends upwardly past the top edge 20 of the perimeter wall 16 of the outer container 12. Multiple interchangeable skirts 74 may be provided to differ the appearance of the planter assembly 10. The lid 68 may be used to cover the inner container 24. It may be desirable, for example, to cover the plant 36 in winter months or in other situations wherein the plant 36 may be in a visually unappealing state. It may also be desirable to cover the inner container 24 when no plants 36 have been planted into the inner container 24.

The outer container 12 may be kept in the external soil 40 while the inner container 24 is removed to tend to the plant 36 and the soil substrate 38. In this manner, the outer container 12 maintains a space within the external soil 40 so that continual shaping or reshaping is needed when plants 36 are replaced or otherwise tended to outside of the space. The inner container 24 may be formed of a disposable material so that multiple inner containers 24 may be interchangeably used and economically disposed of as different plants 36 are cycled through during use of the planter assembly 10. The planter assembly 10 may also be used independently of the external soil 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A planter assembly comprising:
an outer container having a base wall and a perimeter wall, the perimeter wall being coupled to and extending upwardly from the base wall, the outer container defining an interior space therein, a top edge of the perimeter wall defining an opening to the interior space;
an inner container being positionable in the interior space of the outer container, the inner container comprising a bottom wall and a peripheral wall, the peripheral wall being coupled to and extending upwardly from the bottom wall, the inner container defining a cavity therein, an upper edge of the peripheral wall defining an aperture to the cavity, the cavity having a size such that the inner container is configured for holding a plant and a soil substrate in the cavity;
a turntable being positionable between the base wall of the outer container and the bottom wall of the inner container such that the inner container is rotatable;
a platform being insertable between the base wall of the outer container and the bottom wall of the inner container to increase a spacing between the outer container and the inner container; and
a plurality of first mating members and a plurality of second mating members, each first mating member of the plurality of first mating members being coupled to an associated one of each of the outer container, the turntable, and the platform, each second mating member of the plurality of second mating members being coupled to an associated one of each of the turntable, the platform, and the inner container, each first mating member of the plurality of first mating members being interchangeably coupled to each second mating member of the plurality of second mating members, each first mating member of the plurality of first mating members comprising a plurality of projections, each second mating member of the plurality of second mating members comprising a plurality of receivers, the plurality of receivers being shaped and arranged to releasably receive the plurality of projections.

2. The assembly of claim 1, wherein the turntable comprises:
a bottom member;
a top member being positioned over the bottom member, the top member and the bottom member defining an annular groove therebetween;
an axle pin extending through the bottom member and the top member and rotatably coupling the top member to the bottom member; and
a plurality of ball bearings being positioned in the annular groove.

3. The assembly of claim 1, further comprising a pair of protrusions being coupled to and extending outwardly from the outer container, the pair of protrusions being configured to engage an external soil when the outer container is buried in the external soil to prevent rotation of the outer container with respect to the external soil.

4. The assembly of claim 1, further comprising a pair of grip members being coupled to the upper edge of the peripheral wall of the inner container, each grip member of the pair of grip members extending inwardly from the inner container with respect to the inner container.

5. The assembly of claim 1, further comprising a lid being couplable to the upper edge of the peripheral wall of the inner container to cover the aperture to the cavity.

6. The assembly of claim 1, wherein the planter assembly is positionable in a rotatable configuration defined by a stack of the outer container, the inner container, and the turntable, the turntable being positioned between the outer container and the inner container in the rotatable configuration, the upper edge of the peripheral wall of the inner container being aligned with the top edge of the perimeter wall of the outer container in the rotatable configuration.

7. The assembly of claim 1, wherein the planter assembly is positionable in a raised rotatable configuration defined by a stack of the outer container, the inner container, the turntable, and the platform, each of the turntable and the platform being positioned between the outer container and the inner container in the raised rotatable configuration, the upper edge of the peripheral wall of the inner container being spaced above the top edge of the perimeter wall of the outer container in the raised rotatable configuration.

8. The assembly of claim 7, further comprising a skirt being couplable to the upper edge of the peripheral wall of the inner container cover a portion of the inner container which extends upwardly past the top edge of the perimeter wall of the outer container when the planter assembly is positioned in the raised rotatable configuration.

9. A planter assembly comprising:
an outer container having a base wall and a perimeter wall, the perimeter wall being coupled to and extending upwardly from the base wall, the outer container defining an interior space therein, a top edge of the perimeter wall defining an opening to the interior space;
an inner container being positionable in the interior space of the outer container, the inner container comprising a bottom wall and a peripheral wall, the peripheral wall being coupled to and extending upwardly from the bottom wall, the inner container defining a cavity therein, an upper edge of the peripheral wall defining an aperture to the cavity, the cavity having a size such that the inner container is configured for holding a plant and a soil substrate in the cavity;
a turntable being positionable between the base wall of the outer container and the bottom wall of the inner container such that the inner container is rotatable, the turntable comprising:
a bottom member;
a top member being positioned over the bottom member, the top member and the bottom member defining an annular groove therebetween;
an axle pin extending through the bottom member and the top member and rotatably coupling the top member to the bottom member; and
a plurality of ball bearings being positioned in the annular groove;
a platform being insertable between the base wall of the outer container and the bottom wall of the inner container to increase a spacing between the outer container and the inner container;
a plurality of first mating members and a plurality of second mating members, each first mating member of the plurality of first mating members being coupled to an associated one of each of the outer container, the turntable, and the platform, each second mating member of the plurality of second mating members being coupled to an associated one of each of the turntable, the platform, and the inner container, each first mating member of the plurality of first mating members being interchangeably coupled to each second mating member of the plurality of second mating members, each first mating member of the plurality of first mating members comprising a plurality of projections, each second mating member of the plurality of second mating members comprising a plurality of receivers, the plurality of receivers being shaped and arranged to releasably receive the plurality of projections;

a pair of protrusions being coupled to and extending outwardly from the outer container, the pair of protrusions being configured to engage an external soil when the outer container is buried in the external soil to prevent rotation of the outer container with respect to the external soil;

a pair of grip members being coupled to the upper edge of the peripheral wall of the inner container, each grip member of the pair of grip members extending inwardly from the inner container with respect to the inner container; and a lid being couplable to the upper edge of the peripheral wall of the inner container to cover the aperture to the cavity.

10. The assembly of claim 9, wherein:

the planter assembly is positionable in a plurality of stacked configurations, the plurality of stacked configurations including:

a rotatable configuration defined by a stack of the outer container, the inner container, and the turntable, the turntable being positioned between the outer container and the inner container in the rotatable configuration, the upper edge of the peripheral wall of the inner container being aligned with the top edge of the perimeter wall of the outer container in the rotatable configuration; and a raised rotatable configuration defined by a stack of the outer container, the inner container, the turntable, and the platform, each of the turntable and the platform being positioned between the outer container and the inner container in the raised rotatable configuration, the upper edge of the peripheral wall of the inner container being spaced above the top edge of the perimeter wall of the outer container in the raised rotatable configuration; and a skirt is couplable to the upper edge of the peripheral wall of the inner container cover a portion of the inner container which extends upwardly past the top edge of the perimeter wall of the outer container when the planter assembly is positioned in the raised rotatable configuration.

\* \* \* \* \*